United States Patent
Mahimkar et al.

(10) Patent No.: US 11,108,620 B2
(45) Date of Patent: Aug. 31, 2021

(54) MULTI-DIMENSIONAL IMPACT DETECT AND DIAGNOSIS IN CELLULAR NETWORKS

(71) Applicant: AT&T Intellectual Property I, L.P., Atlanta, GA (US)

(72) Inventors: Ajay Mahimkar, Edison, NJ (US); Mubashir Adnan Qureshi, Austin, TX (US); Lili Qiu, Austin, TX (US)

(73) Assignees: AT&T Intellectual Property I, L.P., Atlanta, GA (US); Board of Regents, The University of Texas System, Austin, TX (US)

( * ) Notice: Subject to any disclaimer, the term of this patent is extended or adjusted under 35 U.S.C. 154(b) by 27 days.

(21) Appl. No.: 16/675,053

(22) Filed: Nov. 5, 2019

(65) Prior Publication Data
US 2021/0135925 A1    May 6, 2021

(51) Int. Cl.
| | | |
|---|---|---|
| H04L 12/24 | (2006.01) | |
| H04L 12/26 | (2006.01) | |
| G06N 3/04 | (2006.01) | |
| G06N 3/08 | (2006.01) | |

(52) U.S. Cl.
CPC ........... *H04L 41/0631* (2013.01); *G06N 3/04* (2013.01); *G06N 3/08* (2013.01); *H04L 41/0677* (2013.01); *H04L 43/04* (2013.01); *H04L 43/16* (2013.01)

(58) Field of Classification Search
CPC ... G06F 16/2246; G06F 16/285; G06N 5/022; G06N 20/00
See application file for complete search history.

(56) References Cited

U.S. PATENT DOCUMENTS

| | | | | |
|---|---|---|---|---|
| 10,417,575 B2* | 9/2019 | Nowozin | ............... | G06N 20/20 |
| 10,545,939 B2* | 1/2020 | Kosuru | ............... | G06F 16/2246 |

\* cited by examiner

*Primary Examiner* — Chandrahas B Patel
(74) *Attorney, Agent, or Firm* — BakerHostetler

(57) ABSTRACT

A method for multi-dimensional impact detection and diagnosis of networks. The methods and systems dynamically explore only those network feature combinations that are likely to have problems by using a summary structure Sketch, for example. The method and systems capture fine-grained anomalies at a coarse level which allows for on-demand zoom into the finer-grained levels for further analysis.

20 Claims, 6 Drawing Sheets

MULTI-DIMENSIONAL IMPACT DETECT AND DIAGNOSIS IN CELLULAR NETWORKS

BACKGROUND

Cellular network is a phenomenal success—connecting over 4 billion users, exceeding half of the world's population. Smartphone users heavily rely upon them and expect high availability at all times. Cellular service providers aim to provide excellent quality of experience for users by continuously monitoring the network performance.

Despite its large scale already, the cellular networks continue to grow at an unprecedented rate. It is forecast that the number of smartphone subscriptions will reach 8.3 billion by 2023 and the number of IoT devices may exceed 75 billion in 2025. In order to sustain the rapid growth, many small cells may be deployed across the globe to improve spatial reuse and throughput. The orders of magnitude growth in the number of connected devices and base stations call for not only innovation in wireless communications but also advances in network management and analytics. In particular, operators may no longer rely on dashboards and visualization tools to manually analyze the flood of massive measurement data collected from various network entities. Instead there may be a need for scalable impact discovery and diagnosis tools to efficiently sift through the monitoring data and automatically discover and diagnose performance impacts. This disclosure is directed to addressing issues in the existing technology.

SUMMARY

Disclosed herein are methods, systems, and apparatuses that may automatically analyze the performance across multiple combinations of network features and accurately discover the performance impact. A multi-dimensional impact system may capture fine-grained performance impacts even when the performance is aggregated at coarse granularities. When the impacts are sensed at a coarser-granularity, the multi-dimensional impact system may dynamically zoom into the finer granularity and iterate until it captures most or all performance impacts. There may be multiple approaches for the multi-dimensional impact system. Additional approaches may include: 1) compressive sensing based approach or 2) neural network based approach. High scalability may be achieved in compressive sensing or neural network by leveraging the Lattice or Sketch structure.

In an example, an apparatus (e.g., a server) may include a processor and a memory coupled with the processor that effectuates operations. The operations may include obtaining a first set of records associated with a plurality of devices, generating a lattice based on the first set of records; analyzing each node for one or more anomalies, wherein the analyzing comprises determining whether any dimension in the respective sketch exceeds kσ; based on the analyzing, determining that a first node of the plurality of nodes comprises an anomaly; based on the determining that the first node comprises an anomaly, determining root cause features, wherein the root cause features are a subset of the first set of records; and transmitting (e.g., providing or displaying) a message comprising the root cause of the anomaly for the first node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
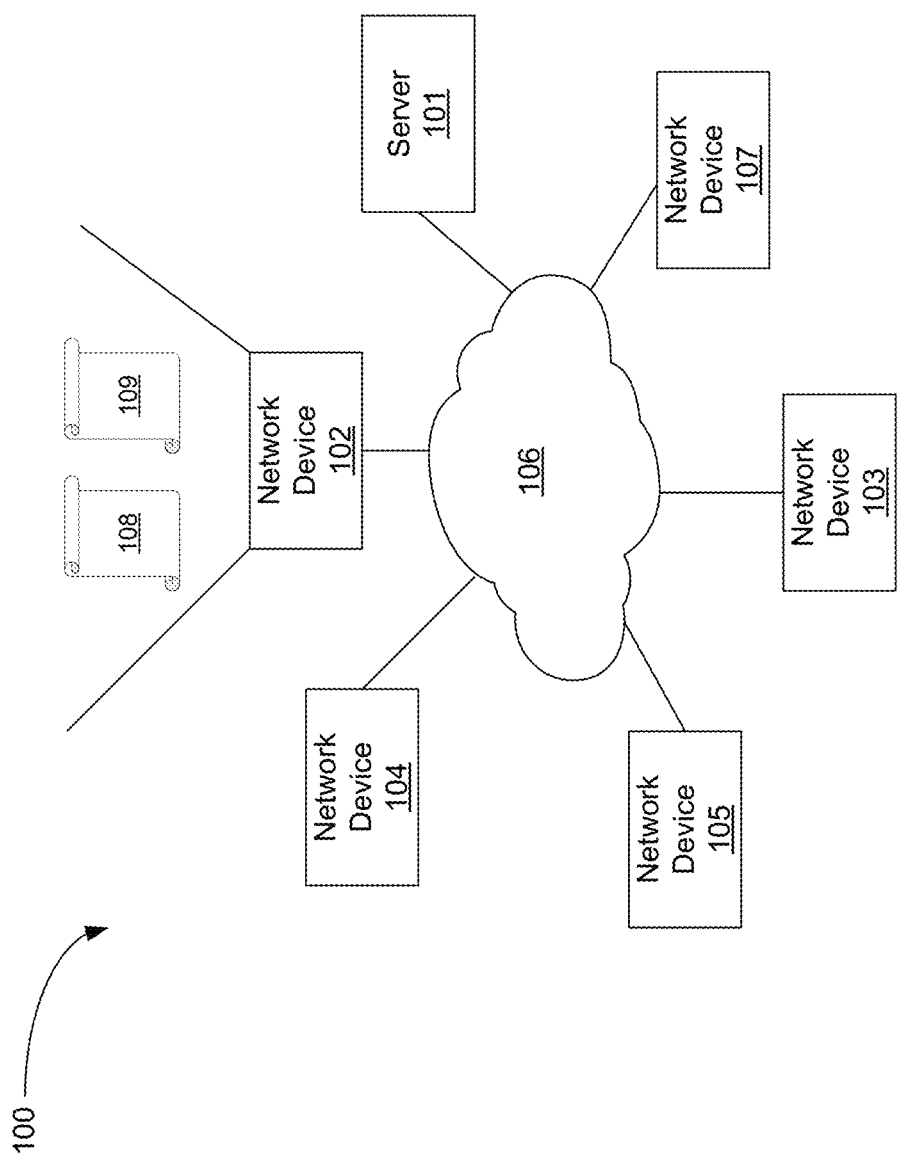
FIG. 1 illustrates an exemplary system for multi-dimensional impact detection and diagnosis.

Service performance impacts are commonly observed in cellular networks and are induced by several factors such as software upgrades, configuration changes, equipment rehomes, failures, or congestion. The network operation teams should rapidly discover the performance impacts and diagnose them to accurately identify the root-cause so that actions can be taken in a timely fashion. Conventionally, the operation teams can automatically capture massive impacts at coarse granularities such as network-wide impacts. The variability in traffic patterns across different granularities can lead to impact cancellation or dilution (e.g., some traffic performance improves and other traffic performance degrades, or only a small amount of traffic degrades, both of which lead to no significant change overall). As a result, there are quite a few performance impacts flying under the operation teams radar and only observable when examined at an appropriate granularity with the right combination of network features. The highly dynamic and complicated nature of cellular networks makes it difficult to predict in advance the appropriate feature combination to analyze. Moreover, the rich set of features and their diverse values may make it expensive to analyze performance impacts across all combinations.

Disclosed herein are methods, systems, and apparatuses (referred herein as the multi-dimensional impact system) that may automatically analyze the performance across multiple combinations of features (e.g., network features or features of other apparatuses) and accurately discover the performance impact. The multi-dimensional impact system may capture fine-grained performance impacts even when the performance is aggregated at coarse granularities. When the impacts are 'sensed' at a coarser-granularity, the multi-dimensional impact system may dynamically zoom into the finer granularity and iterate until it captures most or all performance impacts. There may be multiple approaches for the multi-dimensional impact system. Additional approaches may include: 1) compressive sensing based approach or 2) neural network based approach. High scalability may be achieved in compressive sensing or neural network by leveraging the Lattice or Sketch structure. Disclosed herein are examples of the effectiveness of the multi-dimensional impact system using data collected from a major tier-1 cellular carrier. In addition, results of tests of the scalability of these approaches are provided herein using large scale synthetic traces.

The cellular network is a phenomenal success—connecting over 4 billion users, exceeding half of the world's population. Smartphone users heavily rely upon them and expect high availability at all times. Cellular service providers aim to provide excellent quality of experience for users by continuously monitoring the network performance. Despite its large scale already, the cellular networks continue to grow at an unprecedented rate. It is forecast that the number of smartphone subscriptions will reach 8.3 billion by 2023 and the number of IoT devices may exceed 75 billion in 2025. In order to sustain the rapid growth, many small cells may be deployed across the globe to improve spatial reuse and throughput. The orders of magnitude growth in the number of connected devices and base stations call for not only innovation in wireless communications but also advances in network management and analytics. In particular, operators may no longer rely on dashboards and visualization tools to manually analyze the flood of massive measurement data collected from various network entities. Instead there may be a need for scalable impact discovery and diagnosis tools to efficiently sift through the monitoring data and automatically discover and diagnose performance impacts. The terms performance impacts and anomaly are used interchangeably herein, and both may refer to large positive or negative changes in the performance.

Today, the network operation teams can detect and diagnose massive service performance impacts introduced by network software upgrades, configuration changes, failures, or link congestion. A performance impact may be defined as a statistical change in its behavior in the form of a degradation or an improvement. An impact may be categorized as massive based on its severity and typically actionable by the operations teams (e.g., bug fixes or reboots to resolve a degradation). Conventional capabilities are equipped to deal with such massive impacts that are observed at coarse granularities (e.g., network-wide impacts), or finer granularities (e.g., individual base stations or edge routers).

Cellular networks are very heterogeneous, in which different nodes in network can have significantly different profiles due to different locations, parameters, or user behaviors. Each base station in the network may be associated with a vector of features (e.g., base station software/hardware, radio parameters, handover parameters, carrier frequencies, or phone types). It may not be challenging for conventional systems to catch impact at the entire network level or an individual base station using statistical analysis. However, if an impact is induced due to a specific feature combination and such impact is not large enough at the network-wide level or even individual base station, the impact may go unnoticed. For example, during early phases of a change roll-out, impacts might be hidden in a few configuration combinations. Early discovery of impacts can potentially minimize the negative impacts from spreading. In view of this observation, disclosed herein are systems that may automatically discover the feature combinations that experience significant change. Moreover, the root cause of performance impacts may be diagnosed.

Analyzing performance impact over every feature subset can be very expensive as search space is exponential. Ideally, we want to restrict ourselves to only explore "promising" subsets, subsets which show significant performance impact. A significant issue is how to extract these promising subsets. If analysis is started from coarse granularity, performance impact can be diluted and canceled by other traffic that does not experience major changes or experiences opposite performance impact. Moreover, on the edge (base station), impact may not be significant enough to raise a statistical alarm.

Localizing the set of features that contribute to the performance impact may also be an issue in such scenarios. This is because the aggregates that are the subset or superset of problematic features may also show significant performance impact. Consider, two problematic features A and B. If performance impact is aggregated over data points with feature A or B only, similar performance impact may be observed. Moreover, analysis of performance over aggregate A, B, C where C is another feature will also show strong performance impact. In such scenarios, a goal is to find the set that most accurately characterizes the performance impact (e.g., the intersection of A and B in this case).

Despite machine learnings generally significant progress, applying it to cellular network poses several significant open challenges. First, learning algorithms generally require a lot of training data. Problematic patterns do not arise frequently, which results in scarce training data. Second, cellular network data are massive and may include tens of millions of flows. Conventionally, there is a challenge to analyze massive data without keeping per-flow state. Third, identifying the input and output to use is significant to the effectiveness and scalability of machine learning algorithms.

Disclosed in more detail herein are approaches for multi-dimensional impact detection and root cause analysis (also referred to herein as multi-dimensional impact systems). In a first approach, a Lattice-Sketch, which maintains performance or traffic statistics over feature combinations and on-demand may zoom into a fine-grained level if an impact is observed at a higher level. This on-demand zoom-in may be enabled using summary algorithm Sketch, which reveals the impact of a fine-grained level at a coarse granularity. So, impacts may be detected in massive data streams with millions of flows without maintaining state for each flow. After the performance impacts are identified, the operators may need to diagnose the set of features that lead to the impacts. While several heuristics have been proposed for root cause analysis in the literature, their performance are sensitive to measurement noise. Disclosed herein are multiple root cause diagnosis algorithms, such as: 1) Based on compressive sensing; 2) Based on neural network. The diagnosis algorithms may take the performance associated with various feature combinations as the input and output the root cause by learning a function that maps from the feature values to the performance. Compressive sensing may assume this function is a sparse linear function whereas the neural network may support non-linear functions. The Lattice-Sketch may be leveraged with the compressive sensing to significantly enhance the scalability and avoid exponential growth in the input. In addition, the Sketch may be leveraged with the neural network algorithm to significantly enhance the scalability and avoid exponential growth in the input.

To demonstrate the effectiveness of the approaches, they were evaluated using both real and synthetic data. The results showed that using a sketch dimension of about 5 allows for accurate detection of anomalies involving multiple features in carrier data. Different parameters were stressed tested in the algorithms to show how the algorithm scales with varying numbers of features and anomalies.

High accuracy of root cause detection was observed using the approaches (e.g., compressive sensing approach or neural network approach).

Multi-Dimensional Anomaly Detection: Performance anomalies are common in cellular networks but can be very challenging to detect due to a large traffic volume, high heterogeneity, and the scale at which they affect the network. Some anomalies affect only a subset of network and cannot be captured by statistical analysis applied to overall traffic. Conventional practice used by the operation team is ad-hoc. Some providers just keep track of statistics associated with individual features (e.g., number of dropped calls for certain hardware version), but fail to detect anomalies when they occur due to an interaction between multiple features.

Alternatively, one may try to keep track of the statistics corresponding to all possible feature combinations of all sizes, and apply a standard change detection technique to detect if any feature combination experiences an anomaly. For simplicity and understanding in this disclosure, binary features are used for mathematical analysis. However, the approaches may be applied on carrier data which has non-binary features. For N binary features, there may be a total of $\Sigma_{i=1\ldots N} 2^i * C_i^N = 3^N$ feature combinations, which is prohibitively expensive for a large N. As networks densify in 5G, the number and cardinality of features will increase, which may exacerbate the scalability issue. On the other hand, it is not known in advance which set of features to keep track of. Our hierarchical algorithm maintains a summary structure for individual features first and on-demand expands to keeping track of the statistics corresponding to combinations involving more features.

Problem formulation further described: Input to an anomaly detection engine is a stream of records where each record is defined by a set of feature values and associated performance metric for that record: $(f_1, f_2, \ldots, f_N|p)$, where $f_i$ is the i-th feature value and p is the associated performance metric. Numerical features may be converted into categorical features using domain knowledge. For example, throughput may be mapped to high traffic or low traffic. Depending on the data, the performance metric may be call dropping probability, latency, throughput, or loss rates, among other things. Network operators may also have historical records, which may be used for comparison. An epoch may be minutes, hours, days or weeks and it depends on the time granularity at which the anomalies need to be detected. So a final record becomes $(f_1, f_2, \ldots, f_N|p-K:-1, p_o)$ where p–K:−1 and $p_0$ denote the performance over the previous K epochs and the current epoch, respectively.

Now consider that some feature combinations result in performance anomalies. For example, phones from a particular manufacturer running a specific software version using a specific frequency may have higher than usual call dropping rate. A goal is to automatically identify the anomaly feature combinations (e.g., phone type=x, software version=y, frequency=z). In addition, a goal is to build a detection engine that automatically detects these combinations without exploring the whole search space which may be exponential.

Figure 3:
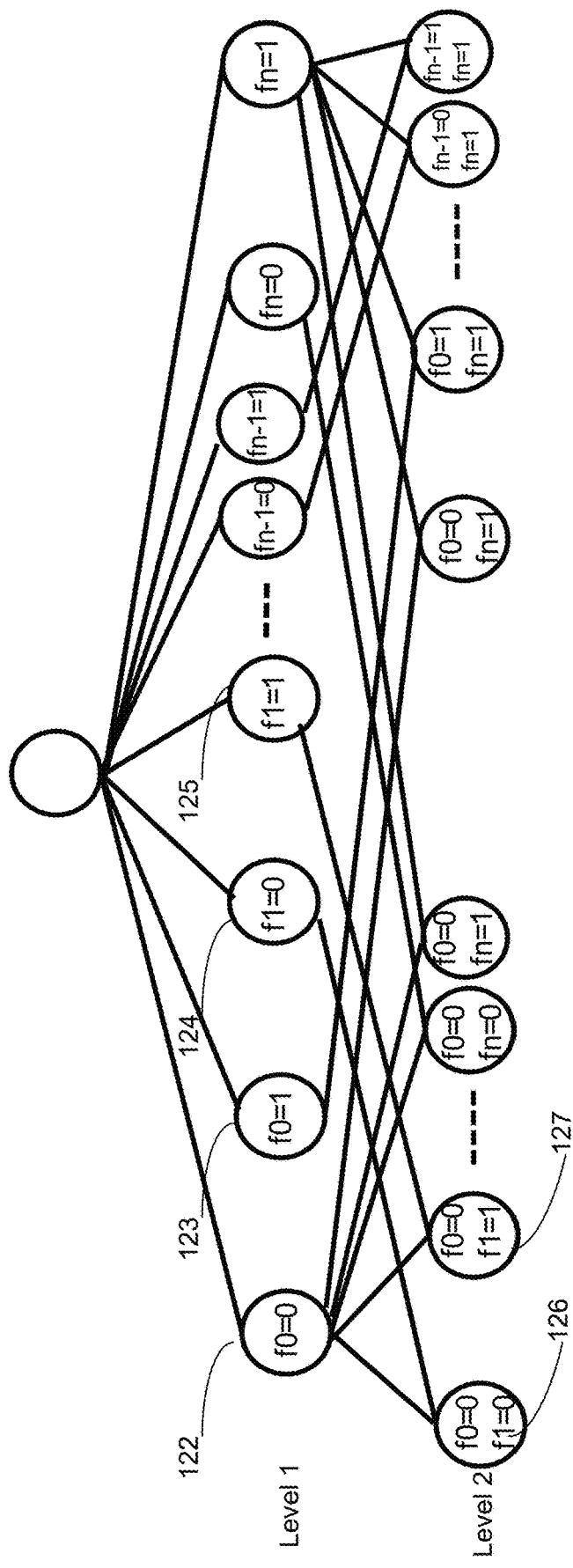
FIG. 3 illustrates an exemplary lattice.

Lattice based anomaly detection: A Lattice structure is used to explore performance for multiway feature interactions. As shown in FIG. 3, the lattice starts with a root at level 0, splits into multiple branches based on one feature value at level 1 (e.g., first dimension), and splits into more branches based on a combination of two features at level 2, and so on. In general, the nodes at level n capture the statistics for combinations of n features. At first level, performance aggregated over an individual feature may be reviewed. On the second level, two features may be combined and performance reviewed when these two feature occur together. On a third level, there may be 3-way combinations, and so on.

Building a complete lattice may be expensive. For anomaly detection purpose, it is not necessarily desirable to build the lattice completely since it may not catch the right set of feature combinations that involve anomalies. For example, if the true anomalies involve two features, using the complete lattice may report three or more feature combinations that include the two anomalous features since they also observe anomalies.

To improve the accuracy and scalability, only those branches that indicate anomalies are explored. Specifically, only the first level of lattice may be analyzed at the start and incoming data may be used to update the statistics for the first level only. Every time a node in the lattice is updated, it may be checked to determine if it has an anomaly (e.g., its value in the current epoch deviates from the previous epochs by more than kσ, where σ is the standard deviation to accommodate the normal fluctuation in the data). If an anomaly is detected, then go to the next level by combining the current set of features with each of the remaining features for more in-depth analysis. The process may be continued as all the data is gone through. A goal is to grow the lattice to include all possible anomalies while minimizing the lattice size.

Limitations: The above approach is intuitive, but anomalies involving multiple features may not be big enough to show up at a coarse level. For example, consider there is an anomaly in a 3-way feature combination: $f_1=0, f_2=0, f_3=0$. But there is lots of other non-anomalous traffic matching $f_1=0$. Aggregating at $f_1=0$ dilutes the effect of anomalous traffic, which does not trigger further lattice expansion and thus fail to detect anomalies.

Lattice-Sketch based Anomaly Detection: There is literature with regard to analyzing massive data streams (e.g., counting the number of flows, heavy hitter detection, change detection) without keeping lots of state. In these literature, a flow is a key value pair (k, v). Since the number of flows can be massive, one cannot afford to keep per-flow state. Instead, summary structures are used that can answer queries in an approximate fashion with provable probabilistic accuracy guarantees. These data structures are effective in detecting heavy hitters. But for anomaly detection, we need to detect a large change. Unlike heavy hitters, where an ancestor of a heavy hitter is also a heavy hitter, an ancestor of a node that experiences a large change may not see a large change due to dilution or cancellation. Therefore, the existing works do not apply to our context.

The pruned lattice may achieve the goal with a note that the anomalies at a deeper level (e.g., involving more features) may not show up at a higher level (e.g., aggregating using fewer features) due to cancellation or dilution during aggregation. Therefore, disclosed herein is a summary structure that can reveal the anomalies from deeper levels even after aggregation. A multi-dimensional summary, Sketch, may be used to achieve this goal.

Sketch: Suppose there are N features and $2^N$ complete feature vectors (assuming binary features). An incoming record specifies a complete feature vector. Each lattice node is associated with a multi-dimensional sketch, where each dimension is a random linear combination of performance metrics of the records matching that node. For example, consider a lattice node $f_0=0$. Any records that match $f_0=0$ will be used to update the lattice node as follows. For the i-th sketch dimension and j-th record, hash the complete feature vector to a random coefficient ($c_{i,j}$) and increment the corresponding sketch dimension by $c_{i,j}p_j$, where $p_j$ is the performance associated with the incoming record. In this way, the K-dimensional sketch is essentially:

$$\sum_{j=1} c_{0,j}p_j, \sum_{j=1} c_{1,j}p_j, \ldots, \sum_{j=1} c_{K,j}p_j$$

For example, consider a dataset with 2 binary features ($f_0$, $f_1$) has 4 possible feature vectors: ($f_0=0$, $f_1=0$), ($f_0=0$, $f_1=1$), ($f_0=1$, $f_1=0$), ($f_0=1$, $f_1=1$). For each sketch dimension, there is a random coefficient corresponding to each feature vector. When a new record (<($f_0=1$, $f_1=1$), p=0.1>) comes in, there may be an update to the sketch value associated with the lattice node $f_0=1$ by incrementing each of its sketch dimension by $c_{k,3}*p=0.1*c_{k,3}$, where k is the sketch dimension index and 3 is the index corresponding to vector ($f_0=1$, $f_1=1$).

Detection rule: An anomaly may be detected if any of the sketch dimension sees a larger than usual change from the previous epochs. Let $\mu$ and $\sigma$ denote the mean and standard deviation of sketch values over the previous epochs, respectively. If the difference between the current and previous epochs is greater than $\mu+3\sigma$, the node may be tagged as anomalous. For example, consider 3 binary features. There is an anomaly in ($f_0=0$, $f_1=0$, $f_2=0$), abbreviated as (0, 0, 0). The anomaly only accounts for 10% traffic. If we sum up the performance of all traffic matching (0, *,*) at $f_0=0$, the anomaly is hidden since most traffic is normal. In comparison, by using k dimension summary, k random coefficients may be generated for each feature combination. If (0, 0, 0) is assigned a large random coefficient in at least one of the k dimensions, the anomaly can show up at a coarse level and trigger in-depth analysis. Moreover, as long as any of the ancestors of (0, 0, 0) (e.g., (0, *, *), (*, 0, *), or (*,*, 0)) detects an anomaly, the lattice may be expanded as desired. Therefore, sketch may significantly increase the likelihood of catching anomalies from the deeper levels.

Exploration strategies: Once a lattice node A sees a large change in at least one sketch dimension, this this branch may be explored further. For example, when a node $f_0=0$ detects a large change in some of its sketch dimensions, it may explore the 2-way feature combinations that involves $f_0=0$. The above condition alone may lead to exploring the lattice unnecessarily deep since children of anomaly nodes tend to also experience anomalies. For example, if the anomaly is $f_0=0$, more fine-grained feature combinations involving $f_0=0$ (e.g., $f_0=0$, $f_1=0$) may also see anomalies. To address the issue, if a node and its parent see similar distributions, the branch is not expand further even if the anomaly detection threshold is reached at the child. So for example, if 5% of calls are dropped for parent node and 5% of calls are dropped for child node, then child node is not adding any more useful information. In this case, we may not want to expand the lattice more from the child node. If call drops on child were say 40%, then its distribution is different from parent, that means it is 'explaining' the anomaly more than the parent so it may be beneficial to explore further. This given statistic may be used to compare distributions. There are different methods to test the similarities between two distributions (e.g., KS-test, Anderson-Darling tests), and find the simple z-statistics based on the mean ($\mu_p$, $\mu_c$) and variance ($\sigma_p$, $\sigma_c$) has been shown to work well. z-statistics is computed as:

$$\frac{\mu_p - \mu_c}{\sqrt{\sigma_p/n_p + \sigma_c/n_c}},$$

where $n_p$ and $n_c$ correspond to the total number of calls at the parent and child, respectively. If it is larger than 2.5, then the distributions may be considered different. After adding this check, it is rare for a lattice to grow beyond the level at which the anomaly is present, thereby improving accuracy and scalability. For further perspective, calls may be considered user placed calls, number of calls for all the records that had that particular feature combination. For example, for records containing f0-0, there were 1000 total calls and (f0-0,f1-0) had 400 total calls. So $n_c$ becomes 400 and $n_p$ is 1000.

If there is additional information about the feature interaction (e.g., from domain knowledge or historical information), then instead of blindly exploring a feature A's interaction all other feature values, exploring the nodes that do not have dependency with A may be skipped. For example, if it is known that carrier frequency (cf) has no effect on A, then we ignore the branch A, cf=*.

Initialization: Initially, statistics for the first lattice layer are kept. When a node has been found to be an anomaly, then go down one layer deeper in the lattice to explore more fine-grained combinations. Go from n-way combinations to (n+1) way combinations. Since statistics were not kept for the new combination until its creation, there may be a need to consider how to initialize the node's statistics. Initializing the node's statistics has impact on the online anomaly detection accuracy and response time. A simple option is to initialize the new node to 0. But it may take a long time for the new node to converge to the actual value. Instead, the parents' values may be used to initialize, which may be based on the independence assumption, e.g. the dropping probability at the child is the product of the dropping probabilities at its parents. Evaluations have shown that the simple independence assumption based initialization works well.

Root Cause Localization: Given the anomalies, we seek to determine the root cause that explains the anomalies. Note that a problematic configuration will induce anomalous behavior in multiple feature combinations. Consider that software version A is the primary problem, then whenever A appears with another feature say hardware version B, the combination (A, B) will also show an anomaly. However, a goal is appropriately define and provide output that only A as the problem. One possible approach for root cause localization is to examine the relationship between a node and its children in the lattice. For example, if most children experience anomalies, their parent (or ancestor) is likely to be the root cause. However, this heuristic may not be as reliable as other techniques, due to measurement noise and probabilistic nature of anomalies.

Disclosed below are approaches for root cause localization. A first approach may use compressive sensing to learn a sparse polynomial. A second approach may use neural network to learn the model that maps performance at various feature combinations to root causes. These two approaches may be complementary. Compressive sensing does not require training and has good interpretability, but it may only support linear models. Neural network may be considered more flexible and may handle non-linear relationship, but may require training.

Compressive Sensing—Define mapping function $f(x)$: Cellular performance may be determined by the features of base stations or mobile devices. Therefore, performance can be viewed as a function of the feature combinations. For simplicity, consider this function is linear, namely $f(x)=Ax$, where $f_i(x)$ denotes the performance vector associated with the i-th lattice node, $x_j$ denotes the weight of the j-th feature combination, and $A(i, j)$ denotes the fraction of the j-th feature combination that is present in the i-th lattice node. In other words, $A(i, j)$ may be considered relationship of each node to other lattice nodes. A goal is to infer x based on $f(x)$ and A. A large absolute value of $x_j$ indicates the j-th feature combination is a potential root cause. $f(x)$ may be considered the change in a key performance indicator for corresponding node. For additional perspective, in A matrix, each row is for unique lattice node. Row contents denote the relationship of other lattice nodes with this unique node. Here, the relationship is how many common number of calls do they have, or rather the fraction. For example, consider that we are looking at relationship between $(f0-0,f1-0)$ and $f0-0$. Using the same numbers as before $f0-0$ has 1000 calls and $(f0-0,f1-0)$ has 400 calls. Then we want to know the 'fraction' of $f0-0$ in $(f0-0,f1-0)$, which is $400/1000=0.4$. This way, we make up the A matrix.

For example, consider 2 binary features: $f_0$ and $f_1$. The polynomial can be defined as $f(x)=P_{f0}=0xf0=0+Pf0=1xf0=1+Pf1=0xf1=0+Pf1=1xf1=1+Pf0=0, f1=0xf0=0,f1=0+Pf0=1,f1=0xf0=1,f1=0+Pf0=0, f1=1xf0=0,f1=1+Pf0=1,f1=1xf0=1,f1=1$ where $P_i$ denotes the fraction of data that matches the condition i and $x_i$ is the weight of the condition i. The reason that the terms were included from both individual features and combinations of features is that the performance may be affected by individual features and combinations of features.

Learning $f(x)$: Learn $f(x)$ based on its evaluation on a few input samples. One constraint may be extracted from a lattice node. Putting together, $f(x)$ may be learned by solving $Ax=b$. For example, for a lattice node $f_0=0$, set the entry in A corresponding to the feature combination $f_0=0$ to 1, since all records seen at the lattice node match $f_0=0$. Set the entry corresponding to $f_0=1$ to 0, since none of the records seen at the lattice node matches $f_0=1$. Set the entry corresponding to $f_1=0$ to the fraction of records seen at the node that matches $(f_0=0, f_1=0)$.

Each lattice node supplies one constraint in A matrix. A solution may be sought that best matches all the constraints. But not all constraints (or lattice nodes) are equally important. The lattice nodes that are associated with more calls should have higher weights. It has been found that weighing each node by $\sqrt{\#calls}$ works well and use it for evaluation.

Incorporating sparsity: Interviewed carriers have suggested that a sparse ground truth—performance degradation is likely due to only a small number of feature combinations. Therefore, some goals are to (i) approximate the measurement data as closely as possible and (ii) maximize the sparsity of the weights. Putting these goals together, we find x such that it optimizes the following objective:

$$\min w\|Ax-b\|_2 + \alpha \sum_i \|x_i\|_1, \quad (1)$$

where w is a weight vector where $w_i$ is $\sqrt{\#calls}$ that matches the lattice node i. The first term in Equation 1 minimizes the weighted fitting error with respect to our measurement. The second term minimizes the L1 norm, which essentially maximizes the sparsity of the solution. $\alpha$ is the relative weight of the sparsity term.

Interpreting x: The solution to the optimization problem x reveals the root cause. The feature combinations associated with large absolute value of x are the estimated root causes. In an example evaluation, the feature combinations may be sorted in a decreasing order of their weight and checked to determine if the true root cause is among one of the top few feature combinations.

Improving scalability: Assuming N binary features, there may be $3^N$ feature combinations. For scalability, not all feature combinations need to be included in the feature matrix. Ideally, only include the feature combinations that can potentially explain the anomalies. Interestingly, the Lattice-sketch structure may capture the features that are related to anomalies, and the features not in the lattice are likely to be unrelated to the anomalies. Therefore, lattice may be used to derive the terms to include in $f(x)$.

Searching $\alpha$: $\alpha$ in Equation 1 controls the relative importance of sparsity term versus fitting error. Performance is sensitive to $\alpha$: a higher value for fewer anomalies and a lower value for more anomalies. Since the number of anomalies is not known in advance, an iterative process has been developed that adjusts its value according to sparsity of the solution: start with a large $\alpha$ which gives all zeros and gradually decrease it until it yields at least few non-zero values in x.

Neural Network is disclosed below. Compressive sensing approach implicitly assumes that the cellular performance is a linear function of the features or combination of features. But in practice, the relationship may be non-linear which a neural network (NN) can model.

Defining input and output: In order to use NN, the input and output should be defined. Our goal is to determine root cause based on the performance across different feature combinations. One possible input to NN can be enumeration of all possible feature vectors and their associated performance statistics (e.g., the first element is the performance corresponding to feature combination 000 . . . 0, the second element is the performance corresponding to feature combination 000 . . . 01, and the last element is the performance corresponding to feature combination 111 . . . 1). If we have binary features, the table size is $O(2^N)$. Output is the probabilities associated with all possible feature combinations. For example, for two binary features, output may represent the probability of the following feature combinations: $f_0=0$, $f_0=1$, $f_1=0$, $f_1=1$, $(f_0=0, f_1=0)$, $(f_0=0, f_1=1)$, $(f_0=1, f_1=0)$, $(f_0=1, f_1=1)$. The feature combinations with high probabilities are considered as the root causes.

Training and testing: Based on the above input and output, data may be generated by injecting synthetic anomalies to the real or synthetic data. The injected anomalies may cause certain feature combinations to be anomalous. The performance statistics may be collected across all feature combinations to use as the input. In the real data, there may not be included performance data about all feature combinations. For the feature combinations that do not have data, fill in 0, which is appropriate for anomaly detection purpose since 0 means that anomalies have not been detected for these entries.

A data split of 80%/20% may be used for training or testing. In training, feed the performance across various feature combinations as input and adapt the neural network to match the corresponding root causes at the output. For training, the root cause feature combinations may be set to 1 in output and the remaining feature combinations may be set to 0. In testing, for example, sort the output in a decreasing order of their associated probabilities and consider the top few as the potential root causes.

A neural network may be built where each layer is fully connected. A sigmoid activation function may be used at the last layer so that the output is a probability between 0 and 1 and use Relu activation at the other layers. For calculation purpose, assume N binary features, the input layer has $2^N$ nodes, and the output layer has $3^N$ nodes. Adam optimization algorithm, or the like, may be used as the optimizer to train the network. The loss function may be defined as the sum of categorical cross-entropy loss and L2 regularization penalty which is used to avoid overfitting. Experiments have found that about 5 layers and 100 iterations give good performance. Further increasing the number of layers and number of iterations does not significantly improve the performance. Table 1 provides information with regard to basic NN performance.

TABLE 1

Basic NN Performance: Total # Features Is 10. # Anomalies Is 1

| # Features in Anomalies | 2 | 3 | 4 | 5 |
|---|---|---|---|---|
| Accuracy | 0.99 | 0.99 | 0.97 | 0.97 |

As shown in Table I, the above approach can identify the root cause of anomalies in the data with an accuracy higher than 97% under a wide range of scenarios. While encouraged by the high accuracy, the approach does not scale with the number of features, since the input and output to the neural network grows exponentially with the number of features.

Sketch-based neural network may address the scalability issue disclosed herein. In particular, the $2^N$ input size not only consumes significant storage, but also may take a long time to train and test due to a large neural network size. To enhance scalability, instead of using raw records as the input, use the sketch at the first layer of the lattice as the input. Specifically, as described herein, a sketch at each node may include multiple random linear combinations of all the records that match the node. Let K denote the sketch dimension and N denote the number of features. Without loss of generality, consider binary features. Each lattice has K dimension, and there are 2N nodes at the first layer. So, the input size is 2N K and much smaller than $2^N$ as K is a small constant. Here we are comparing that 2NK is smaller than $2^N$ as, K is a small constant. So 2NK is much smaller than $2^N$ if N is large.

Intuitively, sketch may be considered a summary of the database by projecting $2^N$ dimension onto 2N K dimension. While there are only 2N nodes at the first dimension, the multidimensional sketch at these nodes captures the variation across all feature combinations to some degree. How much it captures the original records depends on the sketch dimension K. There may be a tradeoff between compression rate vs. accuracy by adapting K. As may be expected, the accuracy increases with the sketch dimension. Evaluations have shown that using K=5 allows for accurate diagnosis of 1 anomaly, and using K=12 allows for accurate diagnosis of 5 simultaneous anomalies. It should be noted that transformation and compression may be used on the input before feeding to neural networks to improve efficiency and sketch may be a useful transformation to consider.

FIG. 1 illustrates an exemplary system 100 that may implement multi-dimensional impact detection and diagnosis, as disclosed herein. System 100 may include server 101 or network device 102—network device 105 that may be communicatively connected via network 106. Network devices, such as network device 102 may be any device (e.g., mobile phone, base station, laptop, desktop, server, or the like) and may be associated with a plurality of features such as feature 108 (e.g., type of software) or feature 109 (e.g., type of hardware). Server 101 may be used to obtain records for analysis and anomaly detection.

Network device 102 through network device 105 may be any network device, such as a user equipment, router, server, switch, virtual machine, or the like. Network device 104 may periodically update its features or may connect with devices with different features. Network device 102 through network device 105 may be for physical or virtual machines. It is contemplated herein that one or more of the functions of the devices of system 100 may be combined or distributed across devices.

Figure 2:
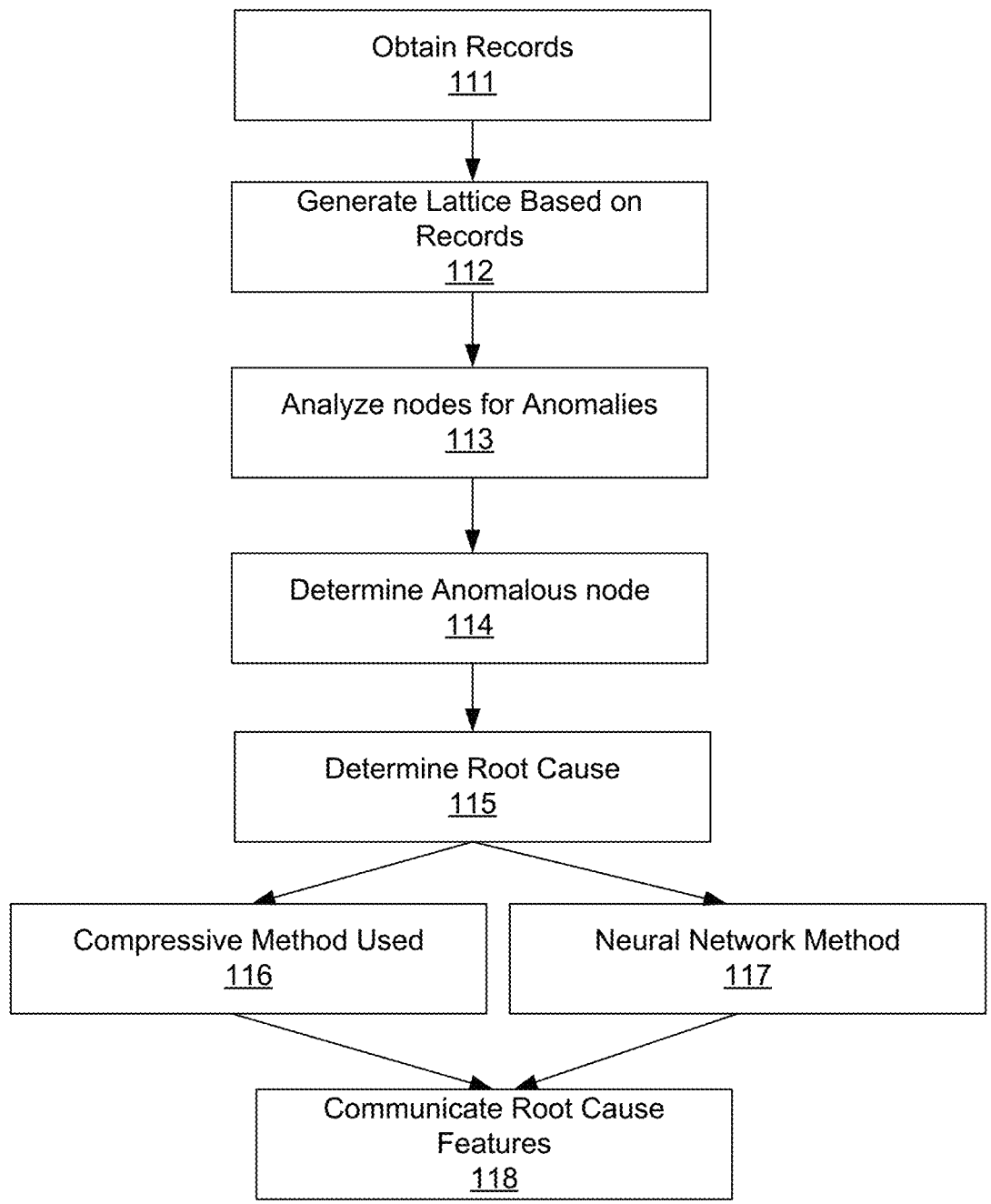
FIG. 2 illustrates an exemplary method for multi-dimensional impact detection and diagnosis.

FIG. 2 illustrates an exemplary method for implementing multi-dimensional impact detection and diagnosis, as disclosed herein. At step 111, a server, for example, may obtain one or more records for one or more devices (e.g., network device 102). The one or more may be a base station, mobile device (e.g., mobile phone, laptop, or the like), or other devices (e.g., network server, desktop, firewall, etc.). For simplicity here there may be an assumption that the one or more devices includes one or more base stations. The one or more records may be obtained from a remote device (e.g., one or more base stations) or generated by the server based on information received from the remote devices. A record may include indications of features as well as indications of performance associated with a device. In this simple example, as shown in Table 2, there may be three binary features on a base station node (e.g., eNodeB or generally "device"). The three binary features may be two types of software versions (e.g., S1 and S2), two types of hardware versions (e.g., H1 and H2), and two types of phone (P1 and P2). As shown in Table 3, for this example, there may be eight unique combinations that can in exist in the network based on the listed number of features. One base station may have software type S1, hardware type H1, and phone type P1 linked to it. For additional perspective, we may use two datasets to construct records, one from call detail records (1) and one from base station configuration dataset (2). Types of phones connected to base station and number of calls dropped/placed for each phone type comes from (1). Base station configuration comes from (2). This information is combined to make records as shown in Table 4. Call Data Records (CDR), for example, may be total calls placed and dropped for each phone type, and may be recorded for for every 15 minute interval. Base Station Configuration Data may be hardware versions, software versions, or features like carrier frequency and antenna configuration, among other things (e.g., a daily configuration snapshot).

TABLE 2

| Features | | |
|---|---|---|
| Software Version | Hardware Version | Phone Type |
| S1 | H1 | P1 |
| S2 | H2 | P2 |

TABLE 3

Possible Combinations

| Software Version | Hardware Version | Phone Type |
|---|---|---|
| S1 | H1 | P1 |
| S1 | H1 | P2 |
| S1 | H2 | P1 |
| S1 | H2 | P2 |
| S2 | H1 | P1 |
| S2 | H1 | P2 |
| S2 | H2 | P1 |
| S2 | H2 | P2 |

TABLE 4

Example Record

| Software Version | Hardware Version | Phone Type | KPI - Wk (−5) | KPI - Wk (−4) | KPI - Wk (−3) | KPI - Wk (−2) | KPI - Wk (−1) | KPI - Wk (−0) |
|---|---|---|---|---|---|---|---|---|
| S1 | H1 | P1 | 0.03 | 0.02 | 0.03 | 0.02 | 0.01 | 0.08 |
| S2 | H1 | P2 | 0.03 | 0.02 | 0.03 | 0.02 | 0.01 | 0.08 |

TABLE 6

Example Dimensions

| | Dimension 1 | Dimension 2 |
|---|---|---|
| Week(−5) | Previous-value + c1*0.03 | Previous-value + c2*0.03 |
| Week(−4) | Previous-value + c1*0.02 | Previous-value + c2*0.02 |
| Week(−3) | Previous-value + c1*0.04 | Previous-value + c2*0.04 |
| Week(−2) | Previous-value + c1*0.05 | Previous-value + c2*0.05 |
| Week(−1) | Previous-value + c1*0.01 | Previous-value + c2*0.01 |
| Week(−0) | Previous-value + c1*0.08 | Previous-value + c2*0.08 |

With continued reference to step 111, Table 4 shows an exemplary record. Each device may generate multiple such records after regular intervals (e.g., 15 minutes, day, week, or month). A shown in Table 4, the first three columns are feature values, next 6 columns indicate performance over different weeks. For example, KPI-Week(0) indicates performance over current week and KPI-Week(−3) indicates performance three weeks before. Timeline can be hour, day, week. Here we are showing for weeks.

At step 112, a lattice may be generated based on the one or more records of step 111. As shown in FIG. 3, a lattice may have multiple levels, in which each level has multiple nodes. Level 1 may include node 122, node 123, node 124, or node 125, among others. As shown, each node includes one feature value in level 1. At level 2, each node (e.g., node 126 or node 127) includes two feature values. Although not shown, since there are three features (hardware, software, and phone) there would be three levels in the lattice. As a reminder, sketch is a summary data structure and lattice is also another data structure that stores hierarchical information. These two are combined into a new data structure Lattice-Sketch. The lattice is 'grown' using sketch. Sketch helps determine whether to explore a lattice branch further or not.

With continued reference to step 112, consider that we are keeping 2 sketch dimensions. Then for the record of Table 5 (e.g., S1, H1, P1 row of Table 4), we have 2 random coefficients, c1 and c2. Notice that if our features are S1, H1, P2, then our random coefficients will be different. We have values for 6 weeks. Whenever, this record comes in we update the sketch values for each week. For example, when a above record comes in, we update the sketch values as provided in Table 6.

TABLE 5

Example Record

| Software Version | Hardware Version | Phone Type | KPI - Wk (−5) | KPI - Wk (−4) | KPI - Wk (−3) | KPI - Wk (−2) | KPI - Wk (−1) | KPI - Wk (−0) |
|---|---|---|---|---|---|---|---|---|
| S1 | H1 | P1 | 0.03 | 0.02 | 0.03 | 0.02 | 0.01 | 0.08 |

With continued reference to step 112, sketch dimension may be different that lattice level. The sketch dimension may mean how many sketch values are kept per lattice node. For example, if the sketch dimension is 5 then 5 sketch values are used per node. As is observed, for each dimension performance metric may be scaled with different weights and the sketch value updated for each dimension by adding the new value. Note that these sketch values are being kept for previous weeks. Mean and standard-deviation of sketch values of previous weeks may be computed in each dimension. If sketch value for current week becomes significantly greater (e.g., mean+3*standard-deviation), then that may indicate that node is anomalous and it needs to be explored further. So if this were a 2nd level node, then when a new record comes in, a 3rd level may be created from this node, which means that lattice is growing. This example is for simplicity. In experiments for this subject matter, about 5 was found to be enough to detect anomalies in the experimental dataset. Depending on the data, this should be set accordingly.

Figure 4A:
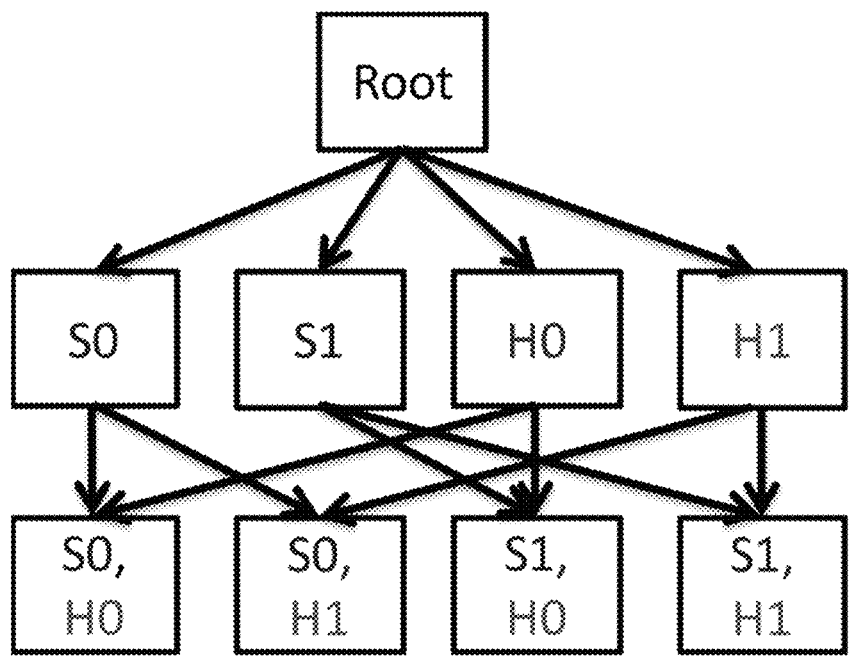
FIG. 4A illustrates an exemplary wholly populated lattice.
Figure 4B:
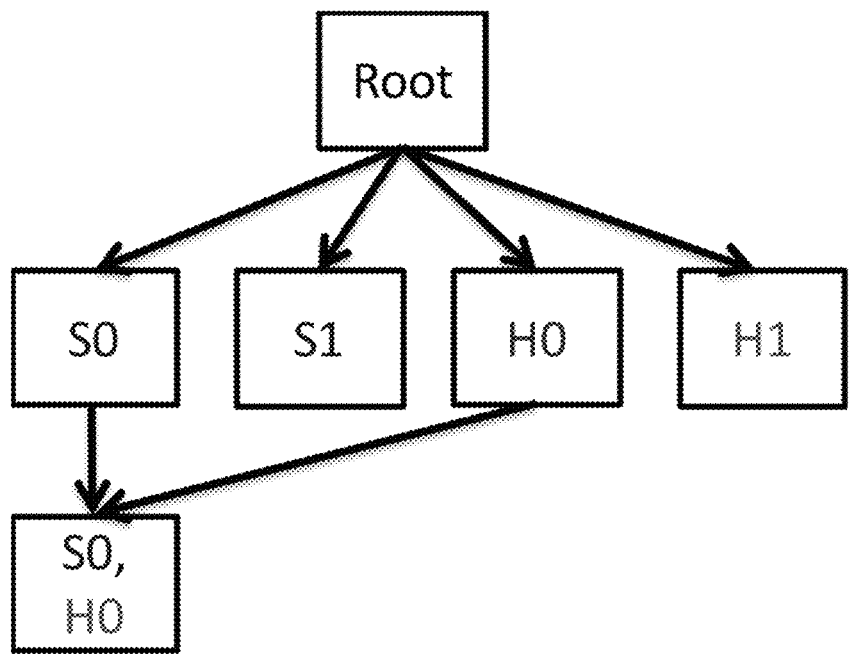
FIG. 4B illustrates an exemplary selectively populated lattice using multi-dimensional impact detection and diagnosis.

At step 113, each node may be analyzed for anomalies, which may include determining whether any dimension in the sketch exceeds $\mu+3\sigma$. For each sketch dimension, we have 6 values, 1 for current week and 5 for previous weeks. We compute mean ($\mu$) and standard deviation ($\sigma$) using previous week's sketch values. Then for any dimension, if current sketch value is greater than ($\mu+3*\sigma$), we decide that there is an anomaly in for a node in a particular branch so we decide to go further down and explore, as disclosed herein, such as the "exploration strategies." As mentioned above, lattice grows downward. For example, if for first level f0-0 appear anomalous, then it may be beneficial to see the anomaly effect of its children. So, statistics of combination of f0-0 with other features may start to be recorded, e.g., (f0-0,f1-0), (f0-0,f1-1) and so on. So there is movement from 1$^{st}$ level to 2$^{nd}$ level for this node. This is what is meant by growing the lattice. The whole lattice in not populated all at once (e.g., FIG. 4A), but grown as needed depending on which lattice nodes appear anomalous (e.g., FIG. 4B).

At step 114, based on the analyzing, there is a determination that a first node (e.g., node 126) of the plurality of nodes comprises an anomaly. For example, node 126 may be greater than ($\mu+3*\sigma$). So, Z-statistic is being used so that we don't grow our lattice unnecessarily. Consider that if performance over f0-0 aggregate is bad then performance over (f0-0,f1-0) will also be bad because it is a subset of bigger set f0-0. Z-statistic is testing whether performance over f0-0 and (f0-0,f1-0) is 'equally' bad of if (f0-0,f1-0) is much worse. If they are equally bad, then no need to explore this branch more because f0-0 explains the anomaly. If (f0-0,f1-0) is much worse, this means that (f0-0,f1-0) sees larger performance impact than f0-0, so f0-0 may not explain why (f0-0,f1-0) is experiencing worse performance, so it may be beneficial to grow the lattice more to explore more feature combinations. At step 115, based on the determining that node 126 is an anomaly then a root cause is determined. As disclosed herein, this may be done via compressive sensor (step 116) or neural networks (step 117) methods.

At step 118, provide indication of one or more features that are the root cause of the performance issues. Based on this indication, the device, e.g., base station, may limit or not allow the one or more features. For example, not allowing a particular phone to connect with to the base station, particularly if there is a nearby alternative that may not have the same performance issues.

Features may be based on information in configuration files of the devices disclosed herein or measurement information (e.g., operations, administration, and maintenance (OAM) information or quality of service information). Features may include number of users, handover associated information, or signal strength, among other things. Features may be grouped into the following exemplary categories: network device-level features, protocol-level features, topological features, or location centric features.

With regard to network device-level features, which may consider network device-level configurations, examples include software version, hardware version, device manufacturer, capacity of radio link, carrier frequencies supported by a device, physical resource block capacity, and backhaul configuration. With regard to protocol-level features, it may be associated with a protocol stack, such as the E-UTRAN protocol. There are three layers in the LTE protocol stack. The physical layer (Layer 1) takes care of link adaptation, power control, cell search (synchronization and handovers), or transport over an air interface. Layer 2 may include MAC (Medium Access Layer), RLC (Radio Link Control), and PDCP (Packet Data Convergence Protocol). Radio resource control (RRC) manages the radio resources including paging, establishment and termination of radio connection between users and E-UTRAN, and management of radio bearer connections with the core network.

Location-centric features may include metrics associated with user mobility, radio channel quality, or user traffic demand, among other things. User mobility metrics may be based on handover measurements, relative signal strength indicator (RSSI), uplink noise, block error rate (BLER), or channel quality indicator (CQI), among other things. User mobility metrics may also be based on user traffic demand using the number of RRC connections, uplink and downlink PDCP volumes, or physical resource block utilizations. Features associated with locations may be quantized and considered. For example, metrics may differentiate a binary (or other fashion) as shown in the following: (i) business versus residential locations (e.g., business=0 or business=1), (ii) venue versus non-venue locations (e.g., venue=0 or venue=1), or (iii) terrain type, such as tall buildings, mountains, flat surface, and user population densities (e.g., population density=0/1/2, which may correspond to rural, suburban, and urban). Venues locations are usually locations where an organized event such as a concert, conference, or sports event may occur. Venues may have very low traffic for most time intervals, but often have a dramatic surge during events.

In summary, a Lattice-Sketch based structure may efficiently detect multi-dimensional performance impacts. Disclosed methods may help determine the root cause for anomalies based on compressive sensing or neural networks. Nearly all impacts may be identified for data as long as the sketch dimension is about 5. Neural network may outperform compressive sensing for a non-linear relationship.

Figure 5:
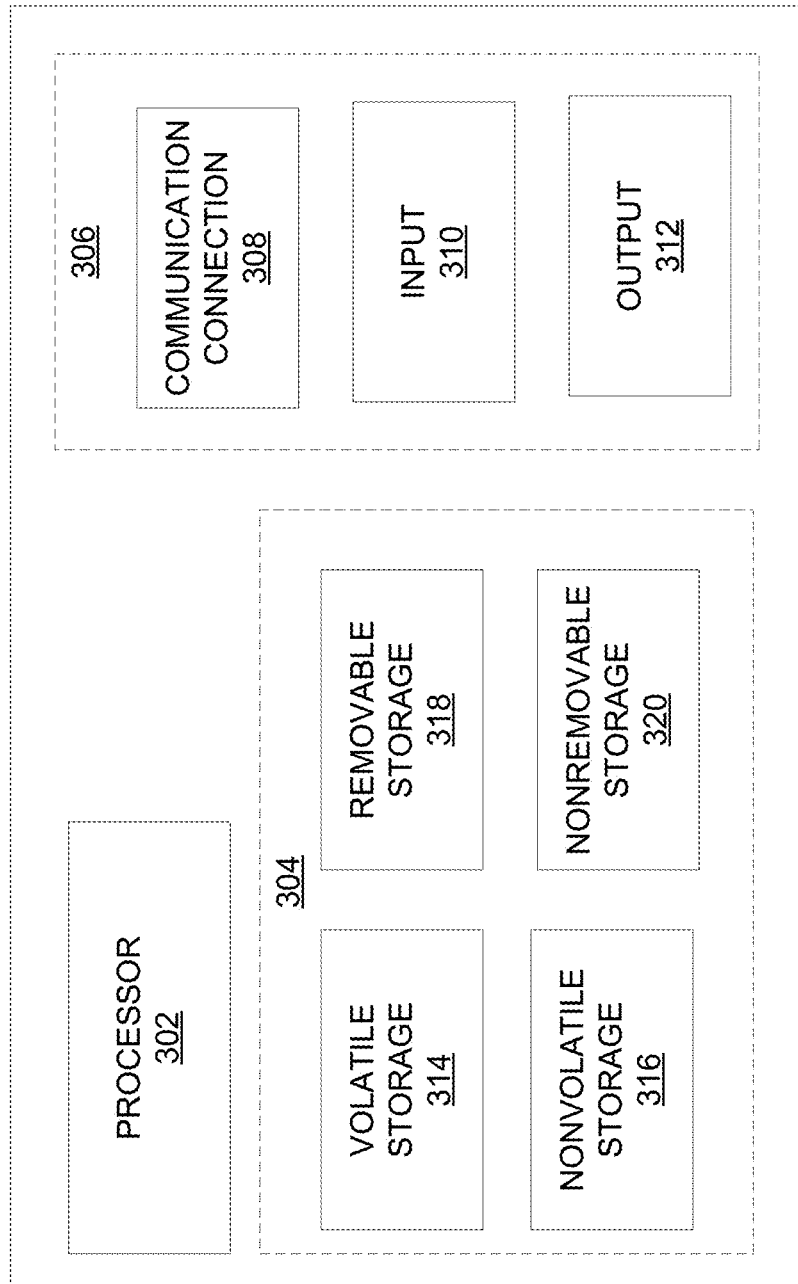
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
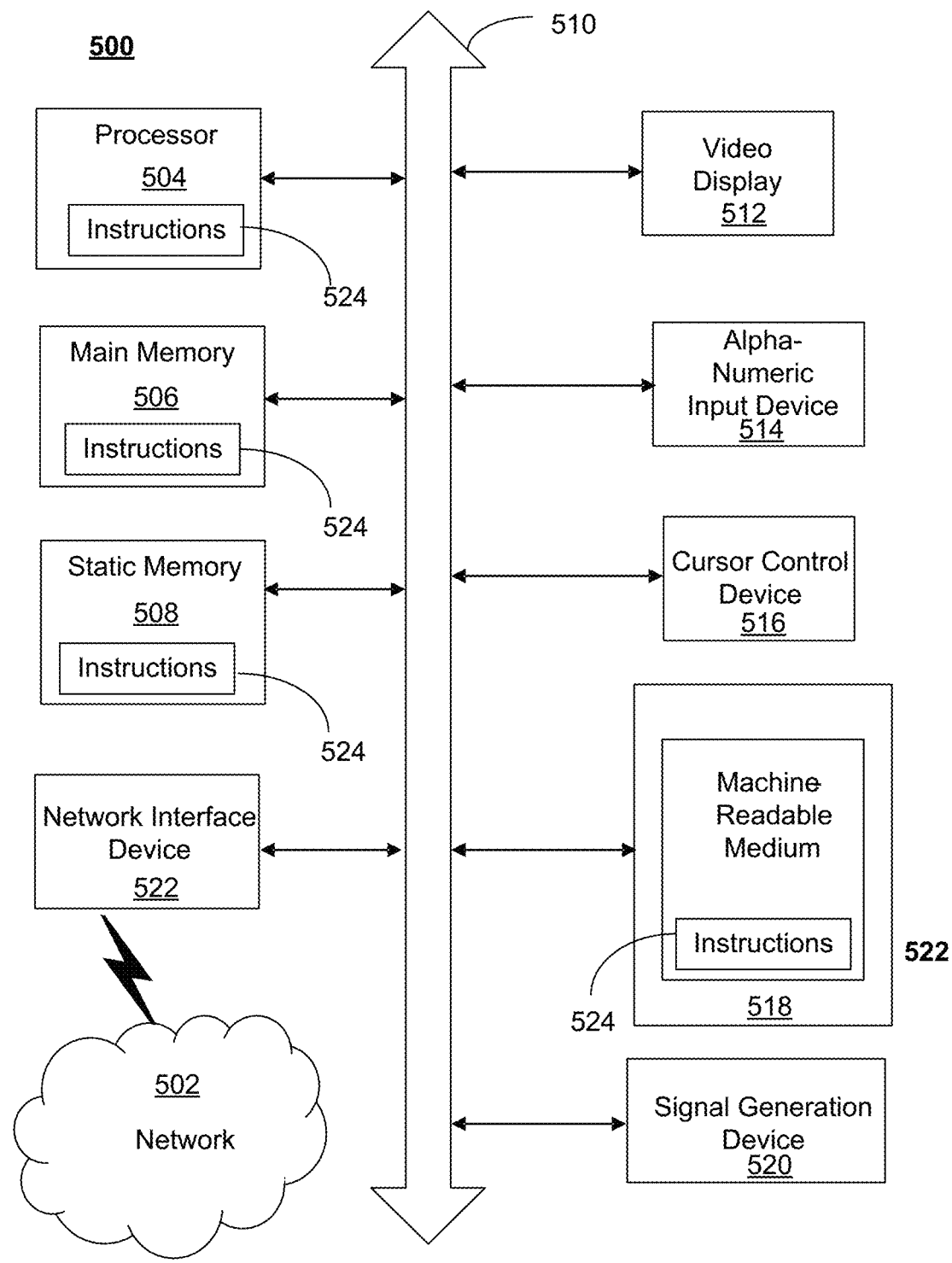
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, server 101, network device 102—network device 105, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which multi-dimensional impact detection and diagnosis can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (e.g., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—multi-dimensional impact detection and diagnosis—as illustrated in the Figures, specific terminology is employed for the sake of clarity. Property may be considered plurality of devices and significant change may be based on standard deviation or threshold change. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein for multi-dimensional impact detection and diagnosis. A method, system, computer readable storage medium, or apparatus may provide for obtaining a first set of records associated with a plurality of devices, generating a lattice based on the first set of records; analyzing each node for one or more anomalies, wherein the analyzing comprises determining whether any dimension in the respective sketch exceeds $k\sigma$; based on the analyzing, determining that a first node of the plurality of nodes comprises an anomaly; based on the determining that the first node comprises an anomaly, determining root cause features, wherein the root cause features are a subset of the first set of records; and transmitting (e.g., providing or displaying) a message comprising the root cause of the anomaly for the first node. The method, system, computer readable storage medium, or apparatus may update the nodes in the current lattice, wherein the updating include incrementing each of the sketch dimensions by $c_{i,j} x_i$, where j is the sketch dimension and $c_{i,j}$ is the corresponding random coefficient. The features may include software version of a base station, software version of a mobile device, hardware version of a base station, or hardware version of a mobile device. All combinations in this paragraph and the below paragraphs (including the removal or addition of steps) are contemplated in a manner that is consistent with the other portions of the detailed description.

A method, system, computer readable storage medium, or apparatus may provide for obtaining a first set of records associated with a plurality of devices, wherein the first set of records comprise indications of features for the devices and indicators of performance of the devices, wherein the features comprise device type, software version, or frequency; generating a lattice based on the first set of records, wherein the lattice comprises a plurality of nodes, wherein each node is associated with a respective device of the plurality of devices; analyzing each node for one or more anomalies, wherein the analyzing comprises determining whether any dimension in the respective sketch exceeds $k\sigma$, wherein $\sigma$ is standard deviation, and wherein k is a constant; based on the analyzing, determining that a first node of the plurality of nodes comprises an anomaly; based on the determining that the first node comprises an anomaly, determining root cause features, wherein the root cause features are a subset of the first set of records; and transmitting a message comprising the root cause of the anomaly for the first node. The k is a constant that is set to 5. A method, system, computer readable storage medium, or apparatus may provide for restricting connections to network devices based on the determined root cause features. The features may include software version of a base station or software version of a mobile device. The features may include hardware version of a base station or hardware version of a mobile device. A method, system, computer readable storage medium, or apparatus may provide for determining the root cause features is based on based on a compressive sensing method. A method, system, computer readable storage medium, or apparatus may provide for determining the root features is based on a neural network method. A method, system, computer readable storage medium, or apparatus may provide for determining the root cause features is based on based on a compressive sensing method, and wherein the compressing sensing method comprises input that comprises enumeration of possible feature vectors and their associated performance statistics. All combinations in this paragraph and the below paragraph (including the removal or addition of steps) are contemplated in a manner that is consistent with the other portions of the detailed description.

Performing multi-dimensional change detection. A method, system, computer readable storage medium, or apparatus may provide for using the incoming record to update one or more entries in a lattice that matches the incoming record, where a lattice consists of partially ordered set of nodes that are organized based on the feature values of a property (e.g., device); adding children to the nodes that see large changes; determining the anomalous nodes in the lattice that have large changes; identifying the paths that go from the root node in the lattice to the anomalous nodes and the paths indicate the feature combinations that experience a large change. Upon the arrival of a new record (key, x), updating k-dimensional counters associated with each lattice node matching the record by $A_i$ x, where $A_i$ is a matrix for the i-th dimension. Determining if the node has a large change by checking if sum $\{i \in n\}$ $c\_i^2/n$ exceeds a threshold where c_i is the counter value in the i-th dimension. Determining if a parent node and child node see similar distributions in their counters using z-statistics as follows: (mu_p-mu_c)/sqrt (sigma_p/n_p+sigma_c/n_c), where n_p and n_c correspond to the number of samples at the parent and child, mu_p and mu_c are the mean of the samples at the parent and child, and sigma_p and sigma_c are the standard deviation of the samples at the parent and child. Initializing a new lattice node using the parents' values based on the independence assumption. Collecting the training data where zero or more anomalies are injected and the training data consists of the values of k-dimensional counters associated with the lattice nodes at the top N levels and the root cause features; training a neural network model using the training data; and applying the neural network model to the current lattice nodes' counters to determine the root cause. All combinations in this paragraph (including the removal or addition of steps) are contemplated in a manner that is consistent with the other portions of the detailed description.

What is claimed:

1. An apparatus comprising:
a processor; and
a memory coupled with the processor, the memory storing executable instructions that when executed by the processor cause the processor to effectuate operations comprising:
  obtaining a record associated with a property;
  determining the record matches a feature of a first node, wherein the first node is in a lattice that comprises a set of nodes that are organized based on feature values of the property;
  updating a first statistic of the first node to a second statistic of the first node;
  determining that the difference between the first statistic and the second statistic has reached a threshold;
  based on the difference between the first statistic and the second statistic reaching the threshold, adding a child node to the first node;
  determining that the child node is anomalous;
  based on determining that the child node is anomalous, determining root cause features, wherein the root cause features are a subset of the records; and
  transmitting a message comprising the root cause of the anomaly for the first node.

2. The apparatus of claim 1, wherein the determining the child node is anomalous is based on determining whether any dimension in the respective sketch exceeds kσ, wherein σ is standard deviation, and wherein k is a constant.

3. The apparatus of claim 1, the operations further comprising initializing a new lattice node using values of the first node based on an independence assumption, wherein the first node is a parent node.

4. The apparatus of claim 1, the operations further comprising restricting connections to network devices based on the determined root cause features.

5. The apparatus of claim 1, wherein the determining the root cause features is based on a compressive sensing method.

6. The apparatus of claim 1, wherein the determining the root cause features is based on a compressive sensing method, and wherein the compressing sensing method comprises input that comprises enumeration of possible feature vectors and their associated performance statistics.

7. The apparatus of claim 1, wherein the determining the root features is based on a neural network method.

8. A non-transitory computer readable storage medium storing computer executable instructions that when executed by a computing device cause said computing device to effectuate operations comprising:
  obtaining a record associated with a property;
  determining the record matches a feature of a first node, wherein the first node is in a lattice that comprises a set of nodes that are organized based on feature values of the property;
  updating a first statistic of the first node to a second statistic of the first node;
  determining that the difference between the first statistic and the second statistic has reached a threshold;
  based on the difference between the first statistic and the second statistic reaching the threshold, adding a child node to the first node;
  determining that the child node is anomalous;
  based on determining that the child node is anomalous, determining root cause features, wherein the root cause features are a subset of the records; and
  transmitting a message comprising the root cause of the anomaly for the first node.

9. The non-transitory computer readable storage medium of claim 8, wherein the determining the child node is anomalous is based on determining whether any dimension in the respective sketch exceeds $k\sigma$, wherein $\sigma$ is standard deviation, and wherein k is a constant.

10. The non-transitory computer readable storage medium of claim 8, the operations further comprising initializing a new lattice node using values of the first node based on an independence assumption, wherein the first node is a parent node.

11. The non-transitory computer readable storage medium of claim 8, the operations further comprising restricting connections to network devices based on the determined root cause features.

12. The non-transitory computer readable storage medium of claim 8, wherein the determining the root cause features is based on a compressive sensing method.

13. The non-transitory computer readable storage medium of claim 8, wherein the determining the root cause features is based on a compressive sensing method, and wherein the compressing sensing method comprises input that comprises enumeration of possible feature vectors and their associated performance statistics.

14. The non-transitory computer readable storage medium of claim 8, wherein the determining the root features is based on a neural network method.

15. A method comprising:
  obtaining a record associated with a property;
  determining the record matches a feature of a first node, wherein the first node is in a lattice that comprises a set of nodes that are organized based on feature values of the property;
  updating a first statistic of the first node to a second statistic of the first node;
  determining that the difference between the first statistic and the second statistic has reached a threshold;
  based on the difference between the first statistic and the second statistic reaching the threshold, adding a child node to the first node;
  determining that the child node is anomalous;
  based on determining that the child node is anomalous, determining root cause features, wherein the root cause features are a subset of the records; and
  transmitting a message comprising the root cause of the anomaly for the first node.

16. The method of claim 15, wherein the determining the child node is anomalous is based on determining whether any dimension in the respective sketch exceeds $k\sigma$, wherein $\sigma$ is standard deviation, and wherein k is a constant.

17. The method of claim 15, the operations further comprising restricting connections to network devices based on the determined root cause features.

18. The method of claim 15, wherein the determining the root cause features is based on a compressive sensing method.

19. The method of claim 15, wherein the determining the root cause features is based on a compressive sensing method, and wherein the compressing sensing method comprises input that comprises enumeration of possible feature vectors and their associated performance statistics.

20. The method of claim 15, wherein the determining the root features is based on a neural network method.

* * * * *